(12) United States Patent
Takkar et al.

(10) Patent No.: US 12,360,636 B1
(45) Date of Patent: Jul. 15, 2025

(54) METHODS FOR ESTIMATING TOUCH LOCATION ON A CAPACITIVE INTERFACE

(71) Applicant: Huawei Technologies Co., Ltd., Shenzhen (CN)

(72) Inventors: Manpreet Singh Takkar, Brampton (CA); Wei Zhou, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/437,735

(22) Filed: Feb. 9, 2024

(51) Int. Cl.
| | |
|---|---|
| *G06F 3/041* | (2006.01) |
| *G06F 3/044* | (2006.01) |
| *G06T 3/02* | (2024.01) |
| *G06T 3/4053* | (2024.01) |
| *G06T 5/20* | (2006.01) |
| *G06T 5/70* | (2024.01) |
| *G06T 7/73* | (2017.01) |

(52) U.S. Cl.
CPC ........ *G06F 3/04186* (2019.05); *G06F 3/0446* (2019.05); *G06T 3/02* (2024.01); *G06T 3/4053* (2013.01); *G06T 5/20* (2013.01); *G06T 5/70* (2024.01); *G06T 7/73* (2017.01); *G06T 2207/10016* (2013.01); *G06T 2207/20081* (2013.01); *G06T 2207/20084* (2013.01)

(58) Field of Classification Search
CPC ..... G06F 3/04186; G06F 3/0446; G06T 3/02; G06T 3/4053; G06T 5/20; G06T 5/70; G06T 7/73; G06T 2207/10016; G06T 2207/20081; G06T 2207/20084

See application file for complete search history.

(56) References Cited

U.S. PATENT DOCUMENTS

| | | | | |
|---|---|---|---|---|
| 8,692,795 | B1* | 4/2014 | Kremin ............... | G06F 3/04166 345/173 |
| 11,620,021 | B1* | 4/2023 | Zhang ................. | G06F 3/04186 345/174 |
| 11,954,288 | B1* | 4/2024 | Wang ................... | G06N 3/0442 |
| 11,983,365 | B1* | 5/2024 | Ling .................... | G06F 3/03545 |
| 2017/0336891 | A1* | 11/2017 | Rosenberg .......... | G06F 3/04144 |
| 2019/0079634 | A1* | 3/2019 | Kravets ................ | G06F 3/045 |
| 2020/0174596 | A1* | 6/2020 | Cohen .................. | G06F 3/044 |
| 2020/0356754 | A1* | 11/2020 | Chen ................... | G06V 40/1365 |
| 2022/0011933 | A1* | 1/2022 | Wu ...................... | G06F 3/04883 |

* cited by examiner

*Primary Examiner* — Amit Chatly
(74) *Attorney, Agent, or Firm* — Slater Matsil, LLP

(57) ABSTRACT

Implementations of the present application provide methods for estimating a location of a detected touch input on a capacitive interface. A capacitive image representing capacitive sensor data associated with the detected touch input is obtained, and a touch region of the capacitive image is identified. The touch region corresponds to an area of the capacitive interface associated with the detected touch input. A first set of features of the identified touch region is extracted using a machine learning model. The extracted first set of features is used to determine first coordinates of the location of the touch input.

20 Claims, 9 Drawing Sheets

METHODS FOR ESTIMATING TOUCH LOCATION ON A CAPACITIVE INTERFACE

TECHNICAL FIELD

The present application relates to human interface devices and, in particular, to methods for estimating intended touch input locations on a capacitive interface.

BACKGROUND

Touchscreens are ubiquitous in modern electronic devices. The most common touchscreen technology used today is capacitive sensing. The input panel of a capacitive touchscreen consists of an insulator that is coated with a transparent conductor, such as indium tin oxide. When an input device (e.g., a user's finger, conductive stylus, etc.) touches or is brought near the surface of a capacitive touchscreen, the local electrostatic field is distorted. The resultant change in capacitance can be measured and used to detect the touch input and determine its location on the touchscreen. The touch location data may then be sent to a controller (e.g., a CMOS digital signal processor) for processing.

Touch accuracy on capacitive interfaces is an important metric for user experience, particularly on mobile devices with limited surface area for touch-based interactions. Errors in touch localization on devices can result in activation of unintended functions and/or additional burdens on the user for taking corrective actions. Existing solutions for estimating touch locations rely primarily on measurements of capacitance change associated with touch inputs.

BRIEF DESCRIPTION OF THE DRAWINGS

Example embodiments are described in detail below, with reference to the following drawings.

Like reference numerals are used in the drawings to denote like elements and features.

DETAILED DESCRIPTION OF ILLUSTRATIVE EMBODIMENTS

Figures 1A, 1B:
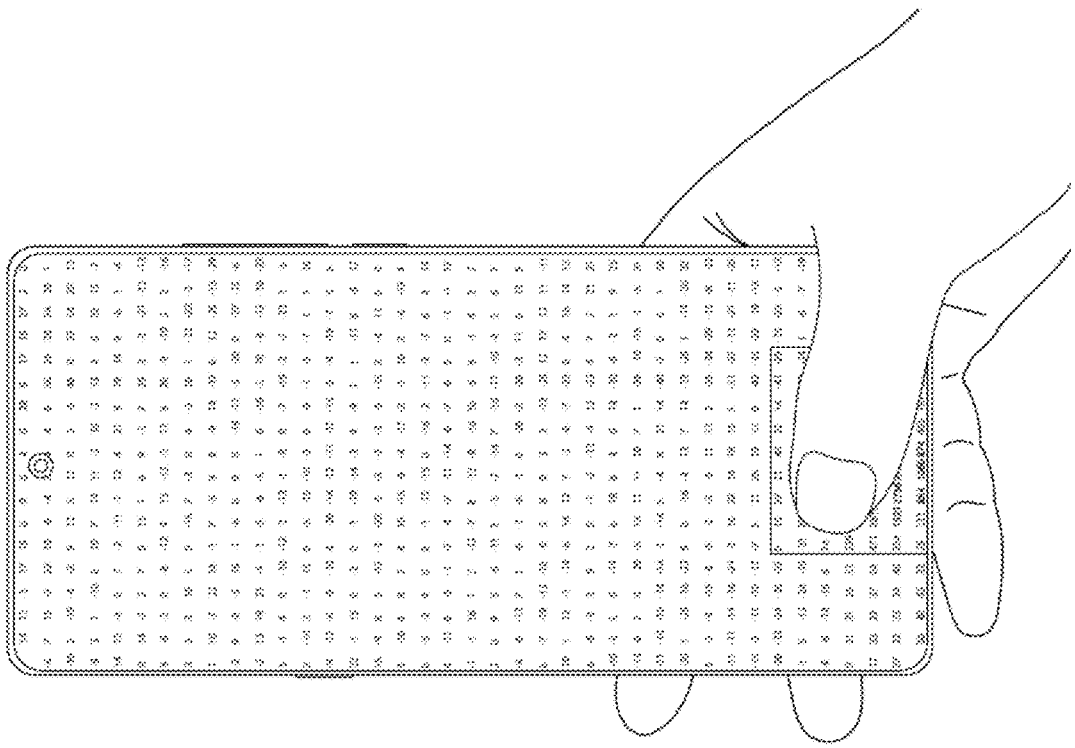
FIG. 1A shows a user interacting with an example touchscreen of an electronic device.
FIG. 1B shows example capacitive sensor data associated with a touch input on the touchscreen of FIG. 1A.

In an aspect, the present disclosure describes a processor-implemented method for estimating an intended touch location of a detected touch input on a capacitive interface. The method may include: obtaining a capacitive image representing capacitive sensor data associated with the detected touch input; identifying a touch region of the capacitive image that corresponds to an area of the capacitive interface associated with the detected touch input; extracting a first set of features of the identified touch region using a machine learning model; and determining first coordinates of the intended touch location of the touch input based on the extracted first set of features.

In some implementations, identifying the touch region may include determining, based on the capacitive sensor data, a region of the capacitive image that is associated with signal strength indicating the detected touch input.

In some implementations, the method may further include determining a sub-image of the capacitive image that contains the touch region, wherein extracting the first set of features may include providing the sub-image as input to the machine learning model.

In some implementations, the method may further include: processing the sub-image using a high-pass filter to obtain a filtered sub-image; and determining a normalized sub-image based on the filtered sub-image, and the normalized sub-image may be provided as input to the machine learning model.

In some implementations, determining the first coordinates of the intended touch location of the touch input may include determining a geometrical centroid based on the extracted first set of features and the first coordinates may comprise two-dimensional coordinates of the geometrical centroid.

In some implementations, determining the first coordinates of the intended touch location of the touch input may include inputting the extracted first set of features to a linear layer configured to output two-dimensional coordinates.

In some implementations, determining the first coordinates of the intended touch location of the touch input may include processing a sequence of two or more capacitive images using a recurrent neural network.

In some implementations, the first coordinates of the intended touch location of the touch input may comprise predicted coordinates within a local coordinate system of the sub-image of the capacitive image and the method may further include determining a mapping between the predicted coordinates and sensor coordinates in a capacitive coordinate system.

In some implementations, the sensor coordinates may be mapped to screen coordinates in a screen coordinate system of a touchscreen associated with the capacitive interface, and the mapping may be determined based on a current orientation of use of the capacitive interface.

In some implementations, the method may further include passing the screen coordinates through a smoothing filter.

In some implementations, the method may further include training the machine learning model using touch input data that is collected for one or more defined touch points on the capacitive interface.

In some implementations, the method may further include: mapping the first coordinates to at least one of: sensor coordinates in a capacitive coordinate system; or screen coordinates in a screen coordinate system; and applying an affine transformation to the at least one of sensor coordinates or screen coordinates for obtaining adjusted touch location coordinates, the affine transformation being defined based on the intended touch location of the touch input.

In some implementations, the method may further include providing a relative position of the touch region with respect to a capacitive coordinate system as input to the learning-based model for obtaining adjusted touch location coordinates.

In some implementations, the machine learning model may be trained to predict super-resolution images based on capacitive images, the super-resolution images having a resolution that is higher than that of the capacitive images, and determining the first coordinates of the intended touch location of the touch input may include: inputting, to the trained machine learning model, a sub-image of the capacitive image containing the touch region for obtaining a higher-resolution version of the sub-image.

In some implementations, the first coordinates of the intended touch location of the detected touch input may be determined based on determining coordinates of a geometrical centroid of the higher-resolution version of the sub-image.

In some implementations, the machine learning model may be trained to predict an elliptical region of the capacitive image that corresponds to sensor output signal indicating a detected touch input and the intended touch location of the detected touch input may be determined using standard regression-based techniques on the determined ellipse parameters.

In some implementations, the method may further include determining latent variable representations of touch input data associated with the detected touch input using an autoencoder that captures features of the touch input data, and the first coordinates of the intended touch location of the touch input may be determined using standard regression-based techniques on latent variables.

In some implementations, the capacitive interface may comprise a touchscreen display of an electronic device.

In some implementations, the machine learning model may comprise a convolutional neural network.

In another aspect, the present disclosure describes an electronic device. The electronic device includes a processor and a memory coupled to the processor. The memory stores computer-executable instructions that, when executed by the processor, may configure the processor to: obtain a capacitive image representing capacitive sensor data associated with the detected touch input; identify a touch region of the capacitive image that corresponds to an area of the capacitive interface associated with the detected touch input; extract a first set of features of the identified touch region using a machine learning model; and determine first coordinates of the intended touch location of the touch input based on the extracted first set of features.

In yet another aspect, a non-transitory computer readable storage medium is disclosed. The computer readable storage medium contains instructions thereon which, when executed by a processor, configure the processor to: obtain a capacitive image representing capacitive sensor data associated with the detected touch input; identify a touch region of the capacitive image that corresponds to an area of the capacitive interface associated with the detected touch input; extract a first set of features of the identified touch region using a machine learning model; and determine first coordinates of the intended touch location of the touch input based on the extracted first set of features.

Other aspects and features of the present application will be understood by those of ordinary skill in the art from a review of the following description of examples in conjunction with the accompanying figures. Example implementations of the present application are not limited to any particular operating system, system architecture, mobile device architecture, server architecture, or computer programming language.

In the present application, the term "and/of" is intended to cover all possible combinations and sub-combinations of the listed elements, including any one of the listed elements alone, any sub-combination, or all of the elements, and without necessarily excluding additional elements.

In the present application, the phrase "at least one of . . . or . . ." is intended to cover any one or more of the listed elements, including any one of the listed elements alone, any sub-combination, or all of the elements, without necessarily excluding any additional elements, and without necessarily requiring all of the elements.

Touchscreen devices implementing capacitive sensing are equipped with a capacitive touch sensor. A capacitive sensor is composed of a grid of sensing electrodes. When a conductive object, such as a finger or stylus, is brought close to or in contact with the touchscreen, multiple cells in the grid are activated. The signal output from the capacitive sensor can be read as a two-dimensional array, or frame, of capacitance data. In particular, each element in the array corresponds to the capacitance value of a cell in the capacitive sensor.

The capacitance values can be read as raw measurements and subsequently processed to obtain a "capacitive image". The pixel values of a capacitive image represent the differences in electrical capacitance between a baseline measurement (when no touch is inputted on the touchscreen) and a measurement of capacitance at a given instance of touch input. Various information about the object's interaction with the touchscreen during a touch input event may be represented by a sequence of capacitive images. An example of a capacitive image of a finger touching a touchscreen is shown in FIG. 1B.

Capacitive sensor data enables derivation of the two-dimensional location of touch inputs. When a finger touch is inputted on a capacitive touchscreen, the pixels in capacitance data that are covered by the finger light up with varying intensity depending on how skin of the finger is deformed at the touch. The capacitance data, as represented in the corresponding capacitive image, can be used to identify a "touch region" of interest for the touch input. Existing solutions for touch localization use a computed "centroid" of the touch region in the capacitive image, combined with some noise removal and smoothing, to estimate the intended touch location of a touch input.

Using the centroid of a touch region as a proxy for an intended touch location may yield a good estimate in instances where the touch is inputted at a fixed orientation, with the finger approaching substantially perpendicular to the touchscreen. However, users typically interact with a touchscreen by inputting touch at different angles, depending on mode of operation, device usage habits, etc., and so the centroid computation approach may not be suitable for generalizing across all of a user's interactions with a touchscreen. The values of capacitance data change even with minute variations in the touch (e.g., changes in finger orientation) and other noise sources. The capacitance values encode important information about the shape of contact and finger posture, and can offer valuable insights into touch behavior and intended location of touch input. Such information is not captured by the centroid computation directly on the capacitive image.

The present application discloses techniques for improving touch localization accuracy on touchscreens using capacitive sensor data. The disclosed techniques leverage use of a trained machine learning model (e.g., a convolutional neural network) for estimating two-dimensional coordinates of touch inputs based on raw capacitive sensor data. The use of a neural network facilitates learning the features of touch behavior that would otherwise be difficult to extract given the noisy nature of touch input data. The present solution can advantageously be implemented using off-the-shelf devices, and does not require sophisticated tracking sensors or additional user actions for precise touch localization.

A machine learning model is trained on touch data collected from users of a touchscreen device. The touch data comprises capacitive images that represent capacitive sensor data associated with detected touch inputs. Users' touch data provides valuable information about their touch behavior. Given a sufficiently large dataset, the model is able to learn meaningful features from the touch data for predicting users' intended touch locations. The trained model can use these features in estimating touch locations of new touch inputs that are received on the touchscreen device.

The present application also describes position-based adjustment of estimated touch coordinates. In test studies involving various touchscreen devices, the comparison of ground truth touch data and predicted touch location data yielded differences, i.e., errors, that appear to follow a pattern correlating to position on the touchscreen. Several factors may contribute to such behavior such as, for example, misalignment between capacitive sensor and display device. To compensate for these errors, the present application proposes applying position-based adjustment to estimated touch coordinates. Various different forms of adjustment are proposed. The adjustment may, for example, be in the form of a global affine transformation of predicted coordinates, or a non-linear local adjustment of the coordinates that is performed using a machine learning model.

Figure 2:
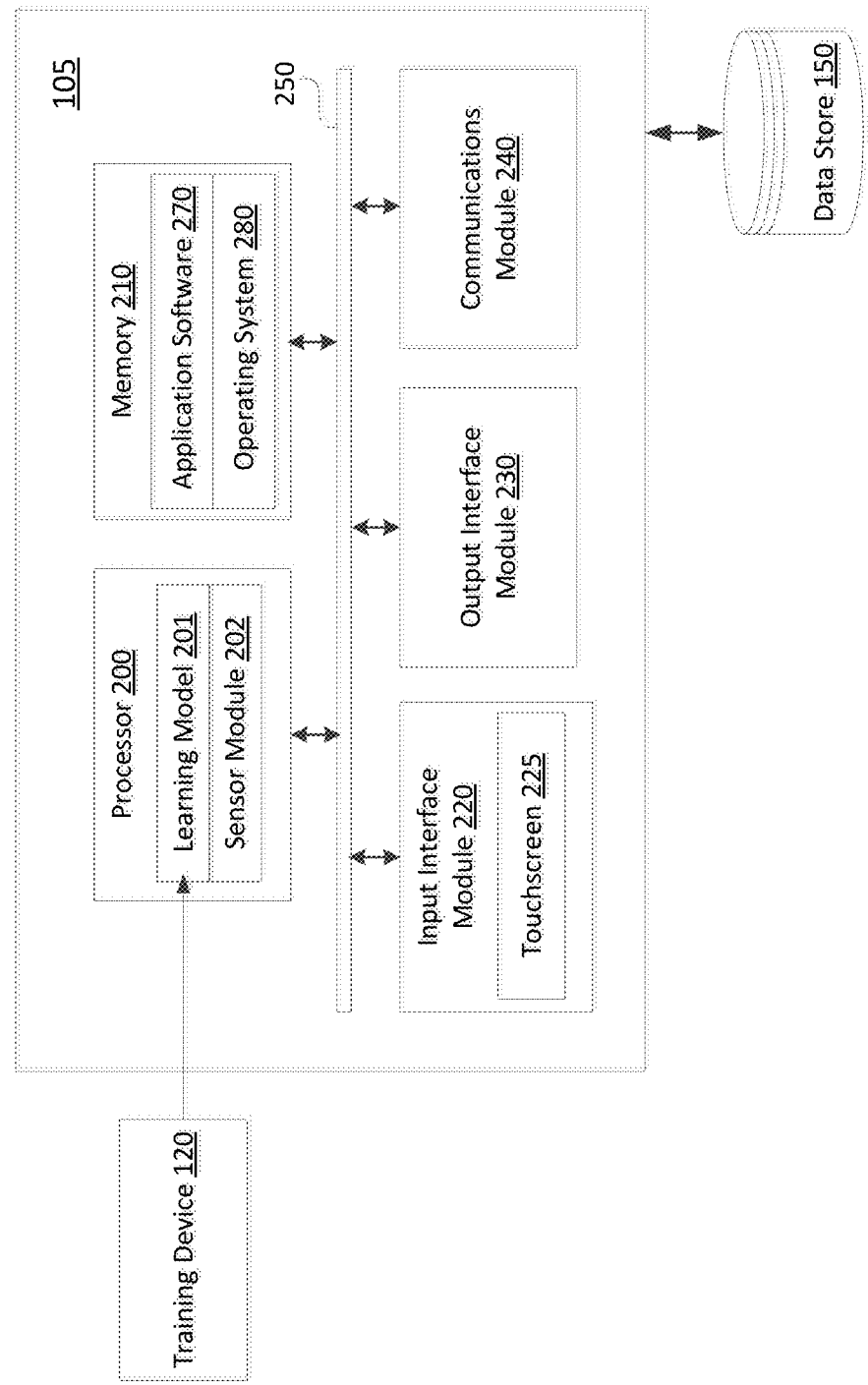
FIG. 2 is a schematic diagram of a system architecture in accordance with an example implementation of the present disclosure.

Reference is made to FIG. 2 which is a schematic diagram of a system architecture in accordance with an example implementation of the present disclosure. The training device 120 is configured to obtain training data. For the touch localization method of the present application, the training data includes capacitive images associated with touch inputs and their ground truth positions. The training data is collected from users of the electronic device 105. In particular, the capacitive images correspond to touch inputs that are received at the electronic device 105, for example, on a touchscreen 225. The training device 120 obtains a machine learning model, such as a neural network, by performing training based on the training data. It will be understood that the model training functions of the training device 120 may be implemented by or in conjunction with the electronic device 105. For example, in at least some implementations, the training device 120 and the electronic device 105 may be the same device.

In order to collect capacitive images that are labeled with a respective touch position, users of the electronic device 105 may be prompted to touch a given point that is displayed on the touchscreen 225. For example, users may be instructed to touch a cross-hair on the touchscreen 225, and the intersection of the perpendicular lines of the cross-hair may serve as the ground truth position of the touch. Training based on actual user inputs enables the machine learning model to capture essential features of human touch behavior. The touch data collected from users may be split into a training set and a test set.

The trained machine learning model can be used to implement the touch localization method of the present disclosure. As illustrated in the schematic diagram of FIG. 3, a capacitive image associated with a touch input undergoes pre-processing prior to being inputted to the machine learning model which may, in at least some implementations, be a convolutional neural network. The processed capacitive image is then input to the machine learning model to obtain estimated touch location data for the touch input. In particular, the output of the machine learning model may comprise estimated touch location at sub-pixel level in the coordinate system of the capacitive sensor of the electronic device 105.

The electronic device 105 includes a variety of modules. For example, the electronic device 105, may include a processor 200, a memory 210, an input interface module 220, an output interface module 230, and a communications module 240. As shown in FIG. 2, the modules of the electronic device 105 may be in communication over a bus 250.

The processor 200 is a hardware processor. The processor 200 may, for example, be one or more ARM, Intel x86, PowerPC processors, or the like. The processor 200 may comprise a set of modules that are implemented in firmware, software, or a combination thereof. Example modules include hardware operation modules for operating hardware (e.g., sensor electrodes, displays, etc.); data processing modules for processing data, such as sensor signals; and reporting modules for reporting information to other components of the electronic device 105.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 105.

The input interface module 220 enables the electronic device 105 to receive input signals. Input signals may correspond to input received from a user of the electronic device 105. The input interface module 220 may serve to interconnect the electronic device 105 with one or more input devices. In particular, input signals may be received from input devices via the input interface module 220. Input devices may, for example, include one or more of: a touchscreen 225, keyboard, trackball, or the like. In some implementations, all or a portion of the input interface module 220 may be integrated with an input device. For example, the input interface module 220 may be integrated with one of the aforementioned input devices.

The touchscreen 225 may implement one or more sensing technologies for detecting user input. Examples of sensing technologies include capacitive, resistive, optical, and surface acoustic wave sensing. The touchscreen 225 is configured to sense touch input provided by input objects, such as fingers and styli. The touchscreen 225 typically integrates both an input and an output (e.g., display) device. Users can interact directly with displayed information on the touchscreen 225, by means of touch inputs, rather than using a peripheral device such as a mouse or touchpad.

In capacitive implementations of the touchscreen 225, arrays of capacitive sensing elements, such as sensor electrodes, are used to create electric fields. Inputs on the touchscreen 225 can be detected by measuring the capacitance at each addressable electrode. When an input object makes contact with, or is in close proximity to, the touchscreen 225, it disturbs the electrostatic fields of the electrodes and alters the capacitance. The change in capacitance can be measured and converted into coordinates that the processor 200 can use to detect touch input. Capacitive sensing, such as may be implemented on touchscreen 225, will now be described in greater detail.

Projected capacitance touch (PCT) is the prevalent variant of capacitive sensing technology. A capacitive sensor grid may be formed either by etching a conductive layer to form a grid pattern of sensor electrodes, or by etching two separate, parallel layers of conductive material with perpendicular tracks to form the grid. There are two types of PCT: mutual capacitance and self-capacitance. Self-capacitance sensing is based on detecting changes in the capacitive coupling between sensor electrodes and an input object. When an input object is brought near the touchscreen 225, the electric field near the sensor electrodes is caused to be altered, changing the measured capacitive coupling. In some implementations, self-capacitance sensing may involve modulating sensor electrodes with respect to a reference voltage (e.g., system ground) and detecting the capacitive coupling between the sensor electrodes and input objects.

Mutual capacitance sensing is based on detecting changes in the capacitive coupling between sensor electrodes, specifically row and column electrodes. Mutual capacitive sensors have a capacitor at each intersection of the rows and columns of the capacitive sensor grid. Voltage is applied to the rows or columns. Bringing an input object near the touchscreen 225 changes the local electric field, which reduces the mutual capacitance. Mutual capacitance allows multi-touch operations in which the interaction of multiple input objects with the touchscreen 225 can be accurately tracked at the same time.

The processor 200 is configured to operate the hardware of the touchscreen 225 to detect touch inputs. Additionally, the processor 200 may operate the sensing elements of the touchscreen 225 (for example, via the sensor module 210) to produce electrical signals indicative of input. The processor 200 may also be configured to digitize analog electrical signals obtained from sensor electrodes, perform filtering or other signal conditioning, and determine touch positional information.

The capacitive sensor grid comprising sensor electrodes may be patterned as an array that includes a plurality of first electrodes and a plurality of second electrodes that are disposed perpendicular to the first electrodes. For example, the first electrodes and the second electrodes may be arranged in a matrix array. The first electrodes and the second electrodes are typically electrically isolated from each other, by positioning insulators to separate the electrodes and prevent them from shorting to each other.

The areas of localized capacitive coupling between first sensor electrodes and second sensor electrodes may be referred to as "capacitive pixels." The capacitive couplings between the first sensor electrodes and second sensor electrodes change with the proximity and motion of input objects in a sensing region associated with the first sensor electrodes and second sensor electrodes.

The sensor pattern may be "scanned" to determine the capacitive couplings. In particular, the first sensor electrodes may be driven to transmit transmitter signals. Transmitters may be operated such that one sensor electrode transmits at one time, or multiple sensor electrodes transmit at the same time. Where multiple sensor electrodes transmit simultaneously, these multiple sensor electrodes may transmit the same transmitter signal and produce an effectively larger sensor electrode, or these multiple sensor electrodes may transmit different transmitter signals. For example, multiple sensor electrodes may transmit different transmitter signals according to one or more coding schemes that enable their combined effects on the resulting signals of second sensor electrodes to be independently determined.

The receiver second sensor electrodes may be operated singly or multiply to acquire the resulting signals. The resulting signals may be used to determine measurements of the capacitive couplings at the capacitive pixels.

A set of measurements from the capacitive pixels form a "capacitive image" (or "capacitive frame") representative of the capacitive couplings at the pixels. Multiple capacitive images may be obtained over multiple time periods, and differences between them can be used to derive information about touch inputs on the touchscreen 225. For example, successive capacitive images obtained over successive periods of time can be used to track the motion(s) of one or more input objects entering, exiting, and within a defined sensing region of the touchscreen 225.

The background capacitance of the capacitive sensor is the capacitive image associated with no touch input. The background capacitance changes with the environment and operating conditions, and may be estimated in various ways. For example, "baseline images" may be obtained when no input object is determined to be in a sensing region of the touchscreen 225, and the baseline images may be used as estimates of their background capacitances.

Capacitive images may be adjusted for the background capacitance of the capacitive sensor for more efficient processing. This can be accomplished by "baselining" measurements of the capacitive couplings at the capacitive pixels to produce a "baselined capacitive image." The measurements forming a capacitance image may be compared with appropriate "baseline values" of a "baseline image" associated with those pixels, and changes from that baseline image can be determined.

In some implementations, the "capacitive frame rate" (the rate at which successive capacitive images are acquired) may be the same or be different from that of the "display frame rate" (the rate at which the display image is updated, including refreshing the screen to redisplay the same image). In some implementations where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region of the touchscreen 225. This is more likely where the capacitive sensing and display updating electrodes are in close proximity to each other, or when they are shared (e.g., combination electrodes).

For simplicity, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, the capacitive images acquired cycle through the frame types and repeat.

The output interface module 230 enables the electronic device 105 to provide output signals. Some output signals may, for example, allow provision of output to a user of the electronic device 105. The output interface module 230 may serve to interconnect the electronic device 105 with one or more output devices. Output signals may be sent to output devices via the output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some implementations, all or a portion of the output interface module 230 may be integrated with an output device. For example, the output interface module 230 may be integrated with one of the aforementioned example output devices.

The communications module 240 enables the electronic device 105 to communicate with other electronic devices and/or various communications networks. For example, the communications module 240 may allow the electronic device 105 to send or receive communications signals. Communications signals may be sent or received according to one or more protocols or according to one or more standards. For example, the communications module 240 may allow the electronic device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally, or alternatively, the communications module 240 may enable the electronic device 105 to communicate using near-field communication (NFC), via Wi-Fi, using Bluetooth™ or via some combination of one or more networks or protocols. Contactless payments may be made using NFC. In some implementations, all or a portion of the communications module 240 may be integrated into a component of the electronic device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

The operating system 280 is software. The operating system 280 allows the application software 270 to access the processor 200, the memory 210, the input interface module 220, the output interface module 230 and the communications module 240. The operating system 280 may be, for example, Apple iOS™, Google Android™, Linux™, Microsoft Windows™, or the like.

As illustrated, the software components stored in memory 210 include application software 270 and an operating system 280. The application software 270 adapts the electronic device 105, in combination with the operating system 280, to operate as a device performing particular functions.

Figure 3:
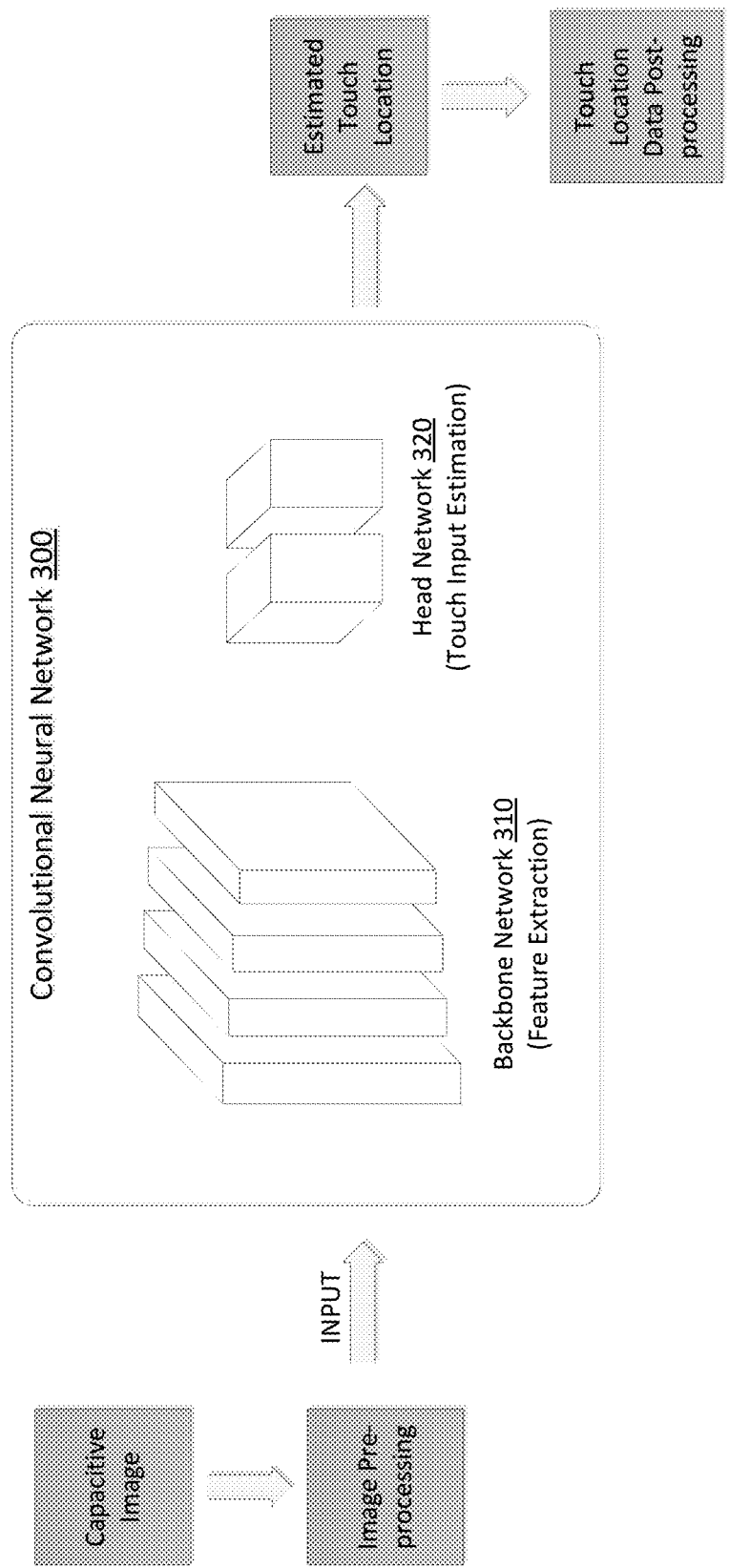
FIG. 3 is a schematic diagram of an example process for estimating intended touch input locations on a capacitive interface.

Reference is now made to FIG. 3, which illustrates an example system architecture for implementing the disclosed methods of estimating intended touch locations on capacitive interfaces.

A convolutional neural network is a type of deep learning model for processing data that has a grid pattern and which is designed to learn spatial hierarchies of features. Specifically, a convolutional neural network is a mathematical construct that is typically composed of three types of layers: convolution, pooling, and fully connected layers. The first two, convolution and pooling layers, perform feature extraction, whereas the third, a fully connected layer, maps the extracted features into a final output, such as classification. A convolution layer plays a key role in a convolutional neural network, which is composed of a stack of mathematical operations, such as convolution, a specialized type of linear operation. In digital images, pixel values are stored in a two-dimensional (2D) grid, i.e., an array of numbers. A small grid of parameters called kernel, an optimizable feature extractor, is applied at each image position. This makes convolutional neural networks highly efficient for image processing, since a feature may occur anywhere in the image. As one layer feeds its output into the next layer, extracted features can hierarchically and progressively become more complex. The process of optimizing parameters, such as kernels, is called training, which is performed so as to minimize the difference between outputs and ground truth labels through an optimization algorithm (such as gradient descent, etc.).

The convolution layers perform feature extraction, which typically consists of a combination of linear and nonlinear operations, i.e., convolution operation and activation function.

The outputs of a linear operation such as convolution are then passed through a nonlinear activation function. Although smooth nonlinear functions, such as sigmoid or hyperbolic tangent (tanh) function, were used previously because they are mathematical representations of a biological neuron behavior, the most common nonlinear activation function used presently is the rectified linear unit (ReLU).

A pooling layer provides a typical down-sampling operation which reduces the in-plane dimensionality of the feature maps in order to introduce a translation invariance to small shifts and distortions, and decrease the number of subsequent learnable parameters. There is no learnable parameter in any of the pooling layers, whereas filter size, stride, and padding are hyperparameters in pooling operations, similar to convolution operations.

The most popular form of pooling operation is max pooling, which extracts patches from the input feature maps, outputs the maximum value in each patch, and discards all the other values. A max pooling with a filter of size 2×2 with a stride of 2 is commonly used in practice. This down-samples the in-plane dimension of feature maps by a factor of 2. Unlike height and width, the depth dimension of feature maps remains unchanged.

The output feature maps of the final convolution or pooling layer are typically flattened, i.e., transformed into a one-dimensional (1D) array of numbers (or vector), and connected to one or more fully connected layers, also known as dense layers, in which every input is connected to every output by a learnable weight. Once the features extracted by the convolution layers and down-sampled by the pooling layers are created, they are mapped by a subset of fully connected layers to the final outputs of the network, such as the probabilities for each class in classification tasks. The final fully connected layer typically has the same number of output nodes as the number of classes. Each fully connected layer is followed by a nonlinear function, such as ReLU, as described above.

Figure 4:
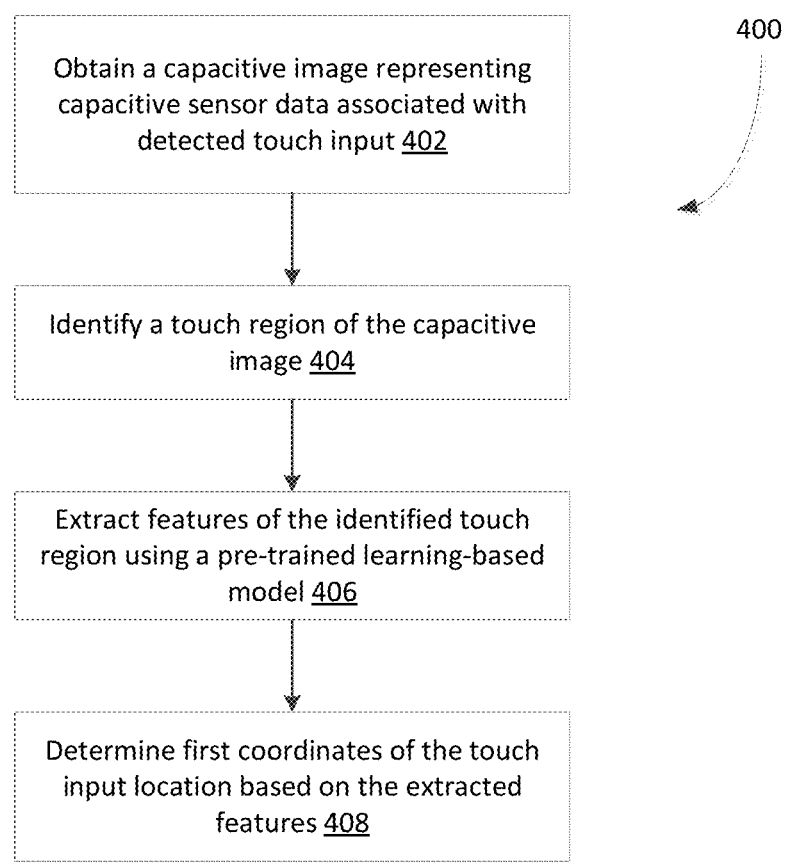
FIG. 4 shows, in flowchart form, an example method for determining an intended touch location of a detected touch input on a capacitive interface.

Reference is now made to FIG. 4 which shows, in flowchart form, an example method 400 for estimating a location of a detected touch input on a capacitive interface.

The method 400 may be implemented by an electronic device having a capacitive interface. For example, the processor 200 of an electronic device 105 (FIG. 2) that is equipped with a capacitive touchscreen may be configured to perform the operations of method 200. The operations may be performed by the processor 200 executing software comprising instructions such as may be stored in the memory 210 of the electronic device 105. Specifically, processor-executable instructions may, when executed, configure the processor 200 of the electronic device 105 to perform all or parts of the method 400.

In operation 402, the processor obtains a capacitive image representing capacitive sensor data associated with a detected touch input on the capacitive interface. The capacitive interface may be, for example, a touchscreen of the electronic device. The touch input may be detected by the processor based on readings acquired by a capacitive sensor associated with the electronic device. When an input object, such as a user's finger or stylus, is brought close to or in contact with the capacitive interface, the capacitive sensor may obtain measurements of changes in capacitance. A touch input can be detected based on the capacitance measurements. In particular, upon receiving the capacitive sensor readings indicating a change in capacitance, the processor may determine that a touch has been inputted on the capacitive interface.

The processor may then obtain the capacitive image associated with the detected touch input, either by automatically receiving the capacitive image or by accessing capacitive image data of the capacitive sensor. In some implementations, responsive to measuring a change in capacitance, the capacitive sensor may automatically provide the capacitive image associated with the detected touch input instance to the processor. The capacitive image represents the difference in electrical capacitance between a baseline measurement and a measurement of capacitance at the time of detecting the touch input on the capacitive interface.

In operation 404, the processor identifies a touch region of the capacitive image. The touch region corresponds to an area of the capacitive interface associated with the detected touch input. More specifically, the touch region represents an area of contact between an input object and the capacitive interface for the touch input instance. In order to identify the touch region, the processor may determine, based on the capacitive sensor data, a region of the capacitive image that is associated with sensor signal strength indicating the detected touch input. In particular, the touch region is a region associated with higher sensor signal level (or signal strength exceeding a defined threshold) than other regions of the capacitive image. For example, the touch region contains at least the cells associated with capacitance values that exceed a defined threshold value. FIG. 1B shows an example representation of a touch region corresponding to a detected touch input, as depicted in the capacitive image 120.

The processor further determines a sub-image of the capacitive image that contains the touch region. That is, a sub-image containing those portions of the capacitive image corresponding to the touch region is determined by the processor. For example, the sub-image may be an area of fixed shape and/or size in the capacitive image, and positioned so as to contain the touch region within it. An example sub-image 150 is illustrated in FIG. 1B. The sub-image 150 is a rectangle of fixed size that contains the touch region.

Figure 5:
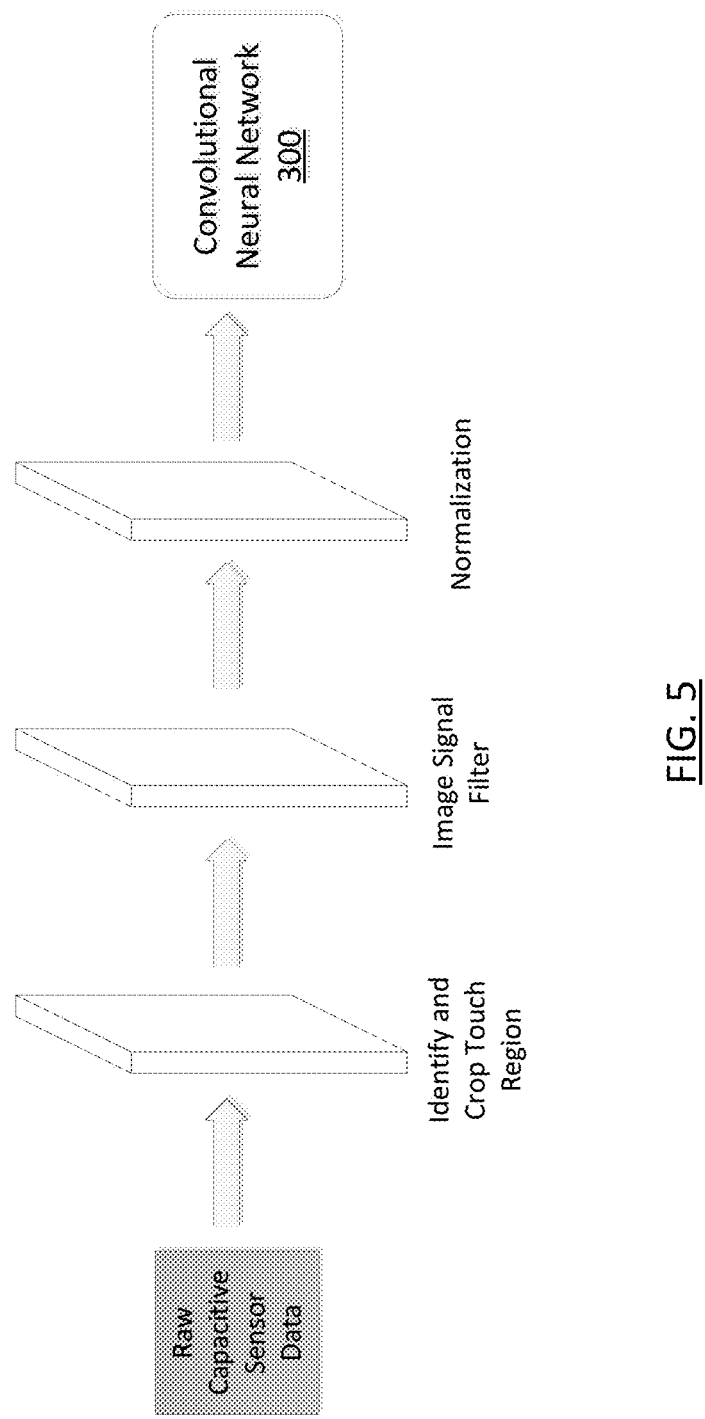
FIG. 5 shows example operations which may be performed in pre-processing a capacitive image.

This operation of identifying the touch region associated with the detected touch input is performed as part of a step for pre-processing the capacitive image. FIG. 5 illustrates exemplary operations for pre-processing a capacitive image prior to providing as input to a trained neural network. The pre-processing of the capacitive image includes finding a region of interest, i.e. the touch region, and "cropping" around the region. The cropped region of the capacitive image is then normalized and passed through an image signal filter, such as a high-pass filter, for noise removal.

The processor first obtains a capacitive image representing raw capacitive sensor data at the time of detecting the touch input instance. A sub-image of the capacitive image that contains the region of touch is identified and cropped. The touch region is distinguishable in the capacitive image data. Specifically, the touch region is an area of the capacitive image that spans multiple pixels where the sensor signal strength is higher (or greater than a defined threshold) relative to other areas of the capacitive image. The number of pixels depends on, among others, sensor pitch and finger size and pose. The processor crops a sub-image containing the touch region, i.e., removes all other portions of the capacitive image from consideration. This sub-image containing the touch region is further processed to estimate the touch location of the detected touch input.

In some implementations, the sub-image may be an area of fixed shape and/or dimensions containing the identified touch region. For example, the processor may crop a n×n region around the touch region, where n can be set to be fixed or variable. The cropped sub-image can be rotated to compensate for the orientation of device, for example, if the device is held in landscape orientation.

As shown in FIG. 5, the processor may also apply an image signal filter to the capacitive image data, specifically the sub-image containing the touch region. In at least some implementations, the image signal filter may be a high-pass filter. The high-pass filter only passes signals with an amplitude exceeding a certain cutoff amplitude. This step attenuates signals with amplitudes lower than the cutoff from the capacitive pixel data inside the crop region. For example, the processor may set the value of all low-amplitude (intensity) pixels to 0. In this way, the cropped sub-image of the capacitive image may be filtered to remove low-amplitude noise, producing a filtered sub-image.

The processor may also normalize the filtered sub-image containing the touch region. For example, the sub-image may be normalized to a range between 0 and 1. This step involves removing any bias value(s) and scaling the sub-image by a defined scaling factor. The bias and scale can be fixed and decided based on values received from the capacitive sensor. The bias and scale can also be dynamically determined to have, for example, 0 mean and unit standard deviation in data. The processor determines the normalized sub-image and outputs it as the output of the pre-processing step.

Referring back to FIG. 4, in operation 406, the processor extracts a first set of features of the identified touch region using a trained machine learning model. The machine learning model may, for example, be a convolutional neural network implemented by the processor. The processor provides the pre-processed sub-image of the capacitive image as input to the machine learning model. In particular, the output of the pre-processing, i.e., a filtered and normalized sub-image of the capacitive image, is fed into the convolutional neural network. The backbone layers of the convolutional neural network, which may include a plurality of convolution and pooling layers, perform feature extraction on the sub-image.

The convolutional neural network is trained using touch data collected from users of the electronic device. The training data includes capacitive images associated with users' touch inputs as well as the ground truth positions of the touches. During training, the capacitive images resulting from users' touches may be logged and stored in memory.

The extracted features of the touch region are then provided as input to the head of the neural network. In operation 408, the processor determines first coordinates of the touch input location based on the extracted first set of features. That is, the processor determines coordinates of an estimate of the intended touch location of the detected touch input. The first coordinates describe a specific location within the sub-image of the capacitive image. In particular, the first coordinates represent predicted coordinates of an intended touch location in a local coordinate system of the sub-image. The precision of these predicted coordinates is of sub-pixel level, and may be represented as float values (and not just integer values commonly used for two-dimensional coordinates).

The sub-pixel precision may allow for mapping the determined first coordinates of the intended touch location to a corresponding screen coordinate system (which may be of higher resolution). The location of the sub-image with respect to the capacitive coordinate system can be used for mapping the first coordinates to sensor coordinates in the capacitive coordinate system. The sensor coordinates may then be mapped to screen coordinates in the screen coordinate system for a touchscreen associated with the capacitive interface. In at least some implementations, the processor determines the first coordinates by determining a geometrical centroid based on the extracted first set of features. In particular, the geometrical centroid is computed on the extracted features, and not directly on the capacitive image. For example, the first coordinates may comprise two-dimensional coordinates of the geometrical centroid.

Figure 6:
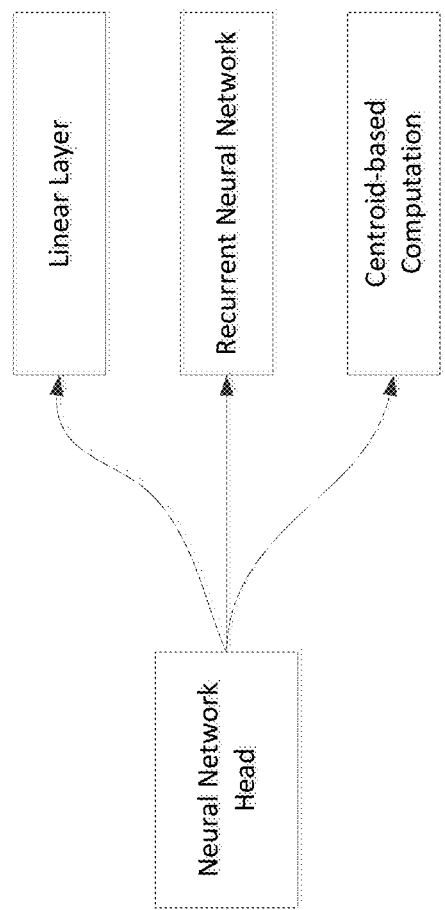
FIG. 6 shows example implementations of the head of the neural network of FIG. 3.

FIG. 6 shows example implementations of the head of the neural network of FIG. 3. The extracted features of the touch region are input to the head, and the output of the head is an estimated touch location of the detected touch input. More particularly, the output comprises an estimate of the intended touch location at sub-pixel level in the local coordinate system of the sub-image of the capacitive image. For example, the head may output two-dimensional coordinates of the estimated touch location, expressed relative to a reference point (e.g., a bottom corner position of the sub-image).

The head of the neural network may be implemented in various different ways. In some implementations, the head may be trained as a simple linear layer that maps extracted features to two-dimensional location coordinates. That is, the linear layer may determine, for each of the extracted features of the touch region, respective two-dimensional coordinates. These coordinates may, in turn, be used to compute an estimated touch location for the detected touch input.

By way of illustration, for the neural network implementation of the present disclosure, the head may be trained to perform centroid calculation, i.e., a geometric centroid is computed based on coordinates of the extracted features of the touch region in capacitance data (as represented in the capacitive image). This technique is in contrast to existing solutions for touch localization that compute a centroid directly on capacitance data. The extracted features outputted by the convolutional neural network, which is trained on touch data collected from real users of the device, encode human touch behavior that cannot be captured in direct centroid computation on capacitance data. In order for such a centroid-based head to be used, the dimensionality of the input and output do not have to match for the convolutional neural network.

Another form of head could be a recurrent neural network. More particularly, in some implementations, the processor may determine the touch location coordinates by processing a sequence of two or more capacitive images using a recurrent neural network. This form of the head can use the information from a sequence of frames and estimate the two-dimensional location of the detected touch input. Advantageously, this implementation may reduce the need of smoothing filter in post-processing of touch location data.

Additionally, or alternatively, the head of the neural network may use position-dependent information to adjust an estimate of the touch location coordinates, as will be described in greater detail below. The position-based adjustment may be device dependent. In some implementations, a device-specific head may be trained to perform position-based adjustment as part of post-processing of touch location data.

Figure 7:
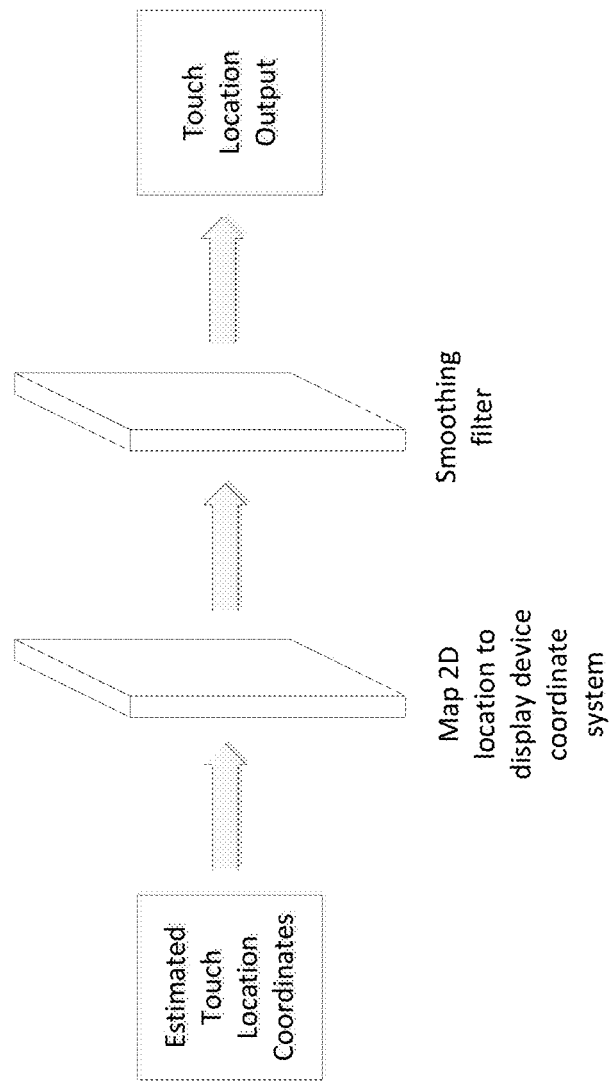
FIG. 7 shows example operations which may be performed in post-processing of estimated touch location data.

Reference is now made to FIG. 7, illustrating example operations which may be performed in post-processing of estimated touch location data. As capacitive images are represented in the coordinate system of the capacitive sensor, the output of the head, i.e., two-dimensional coordinates of the estimated touch location, may also be represented in the capacitive coordinate system. In particular, the coordinates of the estimated touch location of a touch input may be mapped to sensor coordinates in the capacitive coordinate system for the capacitive sensor. The processor determines a mapping between the sensor coordinates associated with the estimated touch location and screen coordinates in a native coordinate system for the touchscreen (e.g., display coordinate system, or DCS). In some implementations, the mapping may be determined based on a current orientation of use of the capacitive interface. In particular, the mapping step needs to account for the orientation of the device, for example if the device is held in landscape orientation, at the time of the detected touch input.

The mapped coordinates, i.e., the screen coordinates in the screen coordinate system of the touchscreen, may then be passed through a smoothing filter, such as a Kalman filter, to get a trajectory of touch that is smooth and to reduce the effect of jitter. The output of the post-processing comprises jitter-free two-dimensional coordinates of the estimated touch location.

The estimates of touch locations may be tested to determine accuracy of the touch localization algorithm and to detect for presence of any systematic errors. A common test for capacitive touch location algorithms involves use of a copper rod attached to a mechanical arm, the copper rod being used to touch the touchscreen at various different points. The estimated locations of the touches, as determined according to a suitable touch localization algorithm, are compared against the ground truth locations of the touch inputs.

Figure 8:
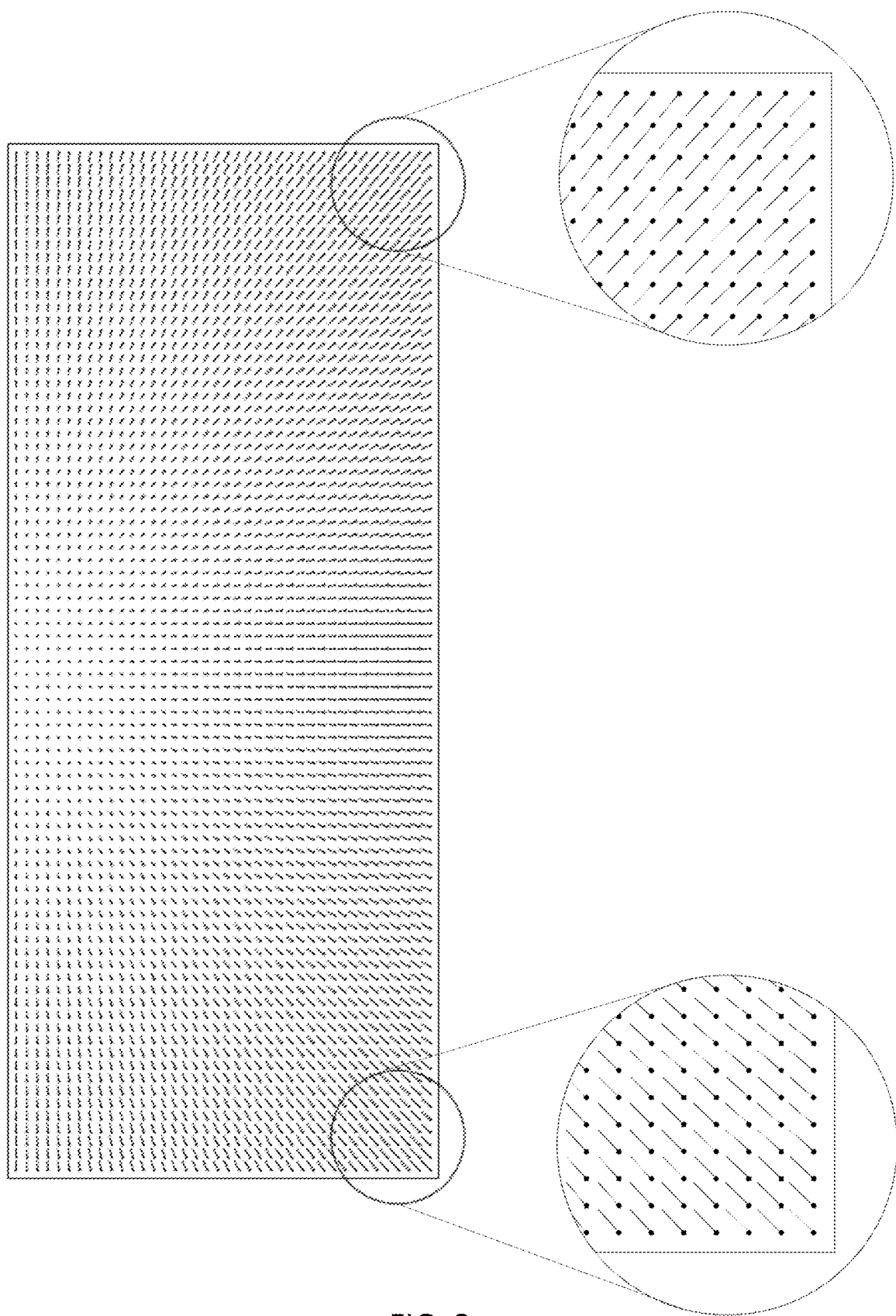
FIG. 8 shows example error vector data representing differences between estimated touch location data and ground truth touch data.

FIG. 8 shows example error vector data representing differences between estimated touch location data and ground truth locations. These are errors which may be output upon testing the estimates produced by the touch localization algorithm of the present application. In FIG. 8, the green dots represent the ground truth locations where the copper rod is aimed and the yellow vectors represent the error vectors. Based on the testing, the magnitude and direction of the error vectors were observed to shift smoothly from one corner of the screen to the other. Similar, but not exactly same, patterns are observed when different devices are tested. That is, the patterns in the test results appear to suggest that the errors in touch location estimates may be a function of touch position on the capacitive interface. Several factors could be contributing to such behavior, such as misalignment between the capacitive sensor and the actual touchscreen of the electronic device.

Figure 9:
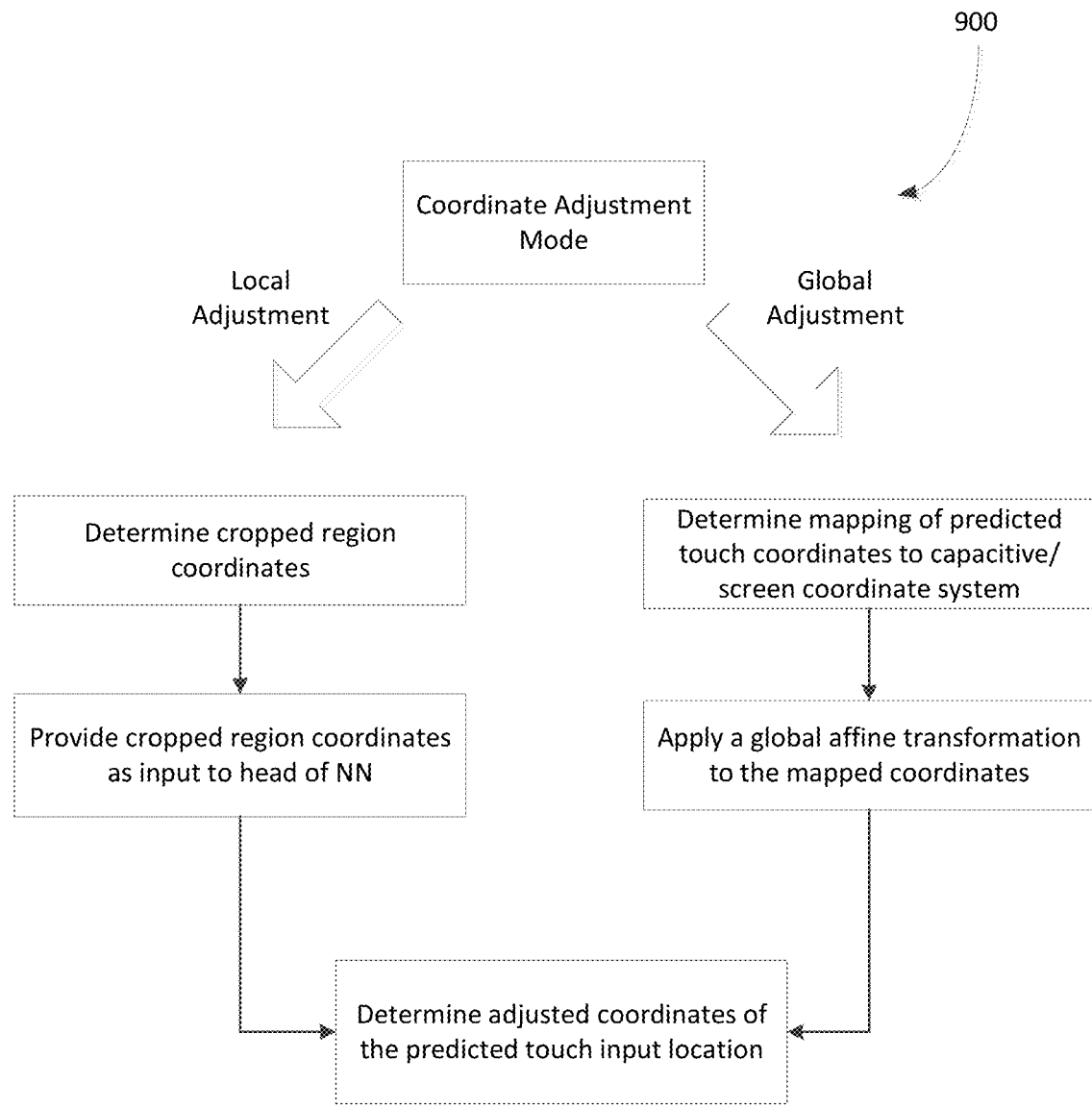
FIG. 9 shows example implementations of position-based adjustment of estimated touch location coordinates.

To compensate for these error vectors, a position-based adjustment of estimated touch location data is proposed. FIG. 9 illustrates example implementations of position-based adjustment of estimated touch location coordinates. The adjustment can be implemented in a number of different ways. In some implementations, a global affine transformation of estimated x and y coordinates of touch input may be performed in order to compensate for the error. In particular, the first coordinates of the intended touch location may first be mapped to the capacitive coordinate system or screen coordinate system, and the affine transformation may be applied to the mapped coordinates. The affine transformation may, for example, be the composition of a linear transformation and a translation.

Additionally, or alternatively, the error pattern information may be incorporated in the head of the neural network. In some implementations, the cropped position of the touch region may be provided as input to the head, so that the head can be trained to use it as a feature as well, giving a more local adjustment. The processor may determine a touch position in the cropped touch region of the capacitive image, and the touch position coordinates may be provided as input to the head.

The proposed adjustment of estimated touch location data may be described using the general equation given below (Eq. 1). In at least some implementations, the adjustment may involve both a scaling and translation component. The function $f$ can be a linear or non-linear function depending on whether a global adjustment across the touchscreen or a local adjustment is desired.

$$(X_{updated}, Y_{updated}) = f(X_{predicted}, Y_{predicted}) \quad (1)$$

$$\begin{bmatrix} X_{updated} \\ Y_{updated} \end{bmatrix} = \begin{bmatrix} A_{11} & A_{12} & A_{13}|b_1 \\ A_{21} & A_{22} & A_{23}|b_2 \end{bmatrix} \begin{bmatrix} \overline{X_{predicted}} \\ \overline{Y_{predicted}} \end{bmatrix} \quad (2)$$

In the simplest case, equation (1) can take the form of equation (2). Here, $$A = \begin{matrix} A_{11} & A_{12} & A_{13} \\ A_{21} & A_{22} & A_{23} \end{matrix}$$

is an affine matrix and $$b = \begin{matrix} b_1 \\ b_2 \end{matrix}$$

is a translation vector. In a more complex case, $f$ in equation (1) may represent a more sophisticated model, like an artificial neural network. The use of position-based adjustment in the head of a neural network may facilitate adjustment of predicted points more locally. This technique of position-based adjustment of estimated touch coordinates enables alignment between capacitive and display coordinates, which enables improved accuracy of touch location estimation and, more particularly, reduced device-specific errors.

As described above, a neural network may be trained using training data that includes capacitive images and corresponding ground truth touch locations. For examples, users of a capacitive interface may be prompted to touch a plurality of given points on the interface, and the intended touch points may serve as ground truths for training the model on. Various additional techniques for training the neural network to extract significant features that capture human touch behavior are proposed.

In at least some implementations, the neural network may be trained to estimate touch regions in high resolution. The pitch of a capacitive sensor grid is generally sized such that fingertips overlap at least two pixels horizontally and vertically. On a typical capacitive touchscreen, each "pixel" in the capacitive coordinate system is approximately 4 mm in size and maps to over 60 pixels in the display coordinate system. This coarse resolution of touchscreens may preclude various interesting applications, and adversely affect the accuracy of touch location estimations.

One way to tackle this is to reduce this ratio by increasing the resolution of capacitive data artificially. This may be achieved by training the neural network to predict super-resolution images from images corresponding to touch inputs in capacitive array, i.e., capacitive images. For example, the touch region may be identified from a capacitive image corresponding to a detected touch input and this touch region (or slightly larger region containing the touch region) could be input to the super-resolution model to obtain a higher resolution version of the touch region. The coordinates of the intended touch location of the detected touch input may be determined, for example, by computing the centroid of this higher-resolution version. By employing super-resolution techniques, the resolution of the capacitive images can be enhanced beyond that of the native capacitive sensor, thereby enabling precise determination of the intended touch location.

In at least some implementations, the neural network may be trained on approximate finger shape. By way of example, the model may be trained to perform shape analysis and predict the best possible ellipse (at same or higher resolution) that would fit a given finger contact region. The parameters of the ellipse, e.g., the focal points, major and minor axis, can be estimated in coordinate space that is of higher resolution that the actual capacitive coordinate system. This can provide finer details on the shape of a touch compared to just a boundary around capacitive pixels of a capacitive image. The model may be trained using standard regression-based techniques on the determined ellipse parameters.

In at least some implementations, the information contained within touch data may be compressed into a plurality of latent parameters that are used by the neural network for training. This can be done using unsupervised methods, such as auto-encoders. The latent parameters generated by this method may contain enough information about a given touch to be then used for touch location estimation. The representations may be determined using standard regression-based techniques on latent variables.

These approaches may provide structure in the capacitive touch data and focus for the neural network to learn important features, rather focusing on arbitrary features, and improve the robustness against unseen data. The network trained using these approaches may serve as a backbone network. The backbone network, comprising convolution and pooling layers, may be combined with a head that is trained to estimate touch locations using the features extracted by the backbone.

The various implementations presented above are merely examples and are in no way meant to limit the scope of this application. Variations of the innovations described herein will be apparent to persons of ordinary skill in the art, such variations being within the intended scope of the present application. In particular, features from one or more of the above-described example implementations may be selected to create alternative example implementations including a sub-combination of features which may not be explicitly described above.

In addition, features from one or more of the above-described example implementations may be selected and combined to create alternative example implementations including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method for estimating an intended touch location of a detected touch input on a capacitive interface, the method comprising:
    obtaining a capacitive image representing capacitive sensor data associated with the detected touch input;
    identifying a touch region of the capacitive image that corresponds to an area of the capacitive interface associated with the detected touch input;
    determining a sub-image of the capacitive image that contains the touch region;
    processing the sub-image using a high-pass filter to obtain a filtered sub-image;
    determining a normalized sub-image based on the filtered sub-image;
    extracting a first set of features of the identified touch region using a machine learning model, wherein the normalized sub-image is provided as input to the machine learning model; and
    determining first coordinates of the intended touch location of the detected touch input based on the first set of features.

2. The method of claim 1, wherein the identifying the touch region comprises:
    determining, based on the capacitive sensor data, a region of the capacitive image that is associated with signal strength indicating the detected touch input.

3. The method of claim 1, wherein the determining the first coordinates of the intended touch location of the detected touch input comprises determining a geometrical centroid based on the first set of features and wherein the first coordinates comprise two-dimensional coordinates of the geometrical centroid.

4. The method of claim 1, wherein the determining the first coordinates of the intended touch location of the detected touch input comprises inputting the first set of features through a regressor configured to output two-dimensional coordinates.

5. The method of claim 1, wherein the determining the first coordinates of the intended touch location of the detected touch input comprises processing a sequence of two or more capacitive images using a recurrent neural network.

6. The method of claim 1, wherein the first coordinates of the intended touch location of the detected touch input comprise predicted coordinates within a local coordinate system of the sub-image of the capacitive image, and wherein the method further comprises determining a mapping between the predicted coordinates and sensor coordinates in a capacitive coordinate system.

7. The method of claim 6, wherein the method further comprises:
    determining a mapping between the sensor coordinates and screen coordinates in a screen coordinate system of a touchscreen and wherein the mapping between the sensor coordinates and screen coordinates is determined based on a current orientation of use of the capacitive interface.

8. The method of claim 7, further comprising;
    passing the screen coordinates through a smoothing filter.

9. The method of claim 1, further comprising:
    training the machine learning model using touch input data that is collected for one or more defined touch points on the capacitive interface.

10. The method of claim 1, further comprising:
    mapping the first coordinates to at least one of:
    sensor coordinates in a capacitive coordinate system; or
    screen coordinates in a screen coordinate system; and
    applying an affine transformation to the at least one of the sensor coordinates or the screen coordinates for obtaining adjusted touch location coordinates, the affine transformation being defined based on the intended touch location of the detected touch input.

11. The method of claim 1, further comprising;
    providing a relative position of the touch region with respect to a capacitive coordinate system as input to the machine learning model for obtaining adjusted touch location coordinates.

12. The method of claim 1, wherein the machine learning model is trained to predict super-resolution images based on capacitive images, the super-resolution images having a resolution that is higher than that of the capacitive images, and wherein the determining the first coordinates of the intended touch location of the detected touch input comprises:
    inputting, to the machine learning model, the sub-image of the capacitive image containing the touch region for obtaining a higher-resolution version of the sub-image.

13. The method of claim 12, wherein the first coordinates of the intended touch location of the detected touch input may be determined based on determining coordinates of a geometrical centroid of the higher-resolution version of the sub-image.

14. The method of claim 1, wherein the machine learning model is trained to predict an elliptical region of the capacitive image that corresponds to a sensor output signal indicating capacitance detected by a capacitive sensor and wherein the intended touch location of the detected touch input is determined using regression-based techniques on determined ellipse parameters.

15. The method of claim 1, further comprising:
    determining latent variable representations of touch input data associated with the detected touch input using an autoencoder that captures features of the touch input data, wherein the first coordinates of the intended touch location of the detected touch input are determined using regression-based techniques on latent variables.

16. The method of claim 1, wherein the machine learning model comprises a convolutional neural network.

17. An electronic device, comprising:
    at least one processor;
    a memory coupled to the at least one processor, the memory storing computer-executable instructions that, when executed by the at least one processor, configure the at least one processor to perform:

obtaining a capacitive image representing capacitive sensor data associated with a detected touch input;

identifying a touch region of the capacitive image that corresponds to an area of a capacitive interface associated with the detected touch input;

determining a sub-image of the capacitive image that contains the touch region;

processing the sub-image using a high-pass filter to obtain a filtered sub-image;

determining a normalized sub-image based on the filtered sub-image;

extracting a first set of features of the identified touch region using a machine learning model, wherein the normalized sub-image is provided as input to the machine learning model; and determining first coordinates of an intended touch location of the detected touch input based on the first set of features.

18. A non-transitory computer-readable medium storing instructions that, when executed by an electronic device, cause the electronic device to:

obtaining a capacitive image representing capacitive sensor data associated with a detected touch input;

identifying a touch region of the capacitive image that corresponds to an area of a capacitive interface associated with the detected touch input;

determining a sub-image of the capacitive image that contains the touch region;

processing the sub-image using a high-pass filter to obtain a filtered sub-image;

determining a normalized sub-image based on the filtered sub-image;

extracting a first set of features of the identified touch region using a machine learning model, wherein the normalized sub-image is provided as input to the machine learning model; and determining first coordinates of an intended touch location of the detected touch input based on the first set of features.

19. The electronic device of claim 17, wherein the identifying the touch region comprises:

determining, based on the capacitive sensor data, a region of the capacitive image that is associated with signal strength indicating the detected touch input.

20. The non-transitory computer-readable medium of claim 18, wherein the identifying the touch region comprises:

determining, based on the capacitive sensor data, a region of the capacitive image that is associated with signal strength indicating the detected touch input.

* * * * *

UNITED STATES PATENT AND TRADEMARK OFFICE
CERTIFICATE OF CORRECTION

PATENT NO. : 12,360,636 B1
APPLICATION NO. : 18/437735
DATED : July 15, 2025
INVENTOR(S) : Takkar et al.

Page 1 of 1

It is certified that error appears in the above-identified patent and that said Letters Patent is hereby corrected as shown below:

In the Claims

In Column 18, in Claim 8, Line 11, delete "comprising;" and insert -- comprising: --.

In Column 18, in Claim 11, Line 26, delete "comprising;" and insert -- comprising: --.

Signed and Sealed this
Twenty-first Day of October, 2025

John A. Squires
*Director of the United States Patent and Trademark Office*